F. W. WHITNEY.

Assignor to F. A. WHITNEY CARRIAGE COMPANY.

Reversible Handles for Children's Carriages.

No. 8,327. Reissued July 9, 1878.

Witnesses

L. F. Connor

N. D. Whitney

Inventor.

Francis W. Whitney by Crosby & Gregory Attys

N. PETERS, PHOTO-LITHOGRAPHER, WASHINGTON, D. C.

UNITED STATES PATENT OFFICE.

FRANCIS W. WHITNEY, OF LEOMINSTER, MASSACHUSETTS, ASSIGNOR TO F. A. WHITNEY CARRIAGE COMPANY.

IMPROVEMENT IN REVERSIBLE HANDLES FOR CHILDREN'S CARRIAGES.

Specification forming part of Letters Patent No. 176,155, dated April 18, 1876; Reissue No. 8,327, dated July 9, 1878; application filed May 13, 1878.

*To all whom it may concern:*

Be it known that I, FRANCIS W. WHITNEY, of Leominster, in the county of Worcester and State of Massachusetts, have invented certain new and useful Improvements in the Mode of Attaching the Handles to Children's Carriages; and the following is a full, clear, and exact description of the same, reference being had to the accompanying drawings, making a part of this specification, in which—

Figure 1:
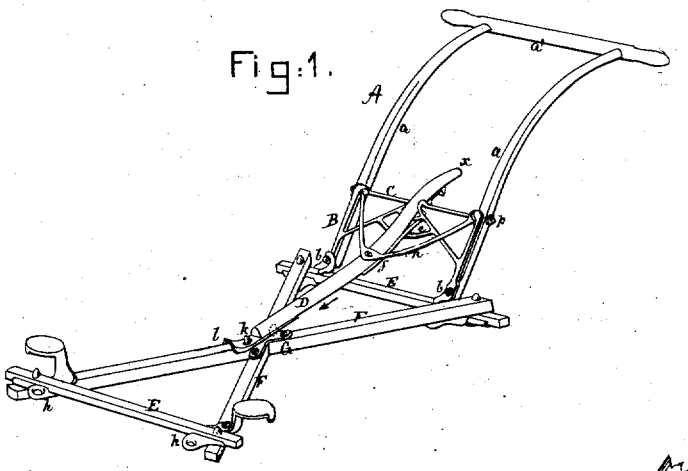
Figure 2:
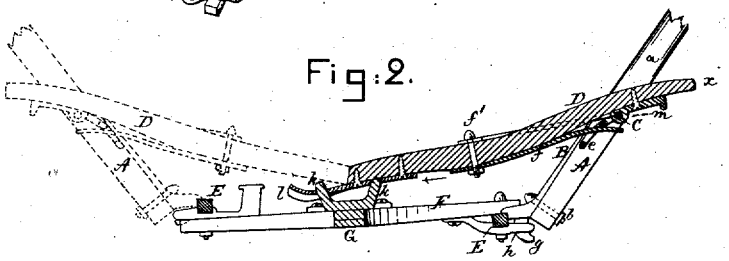
Figure 3:
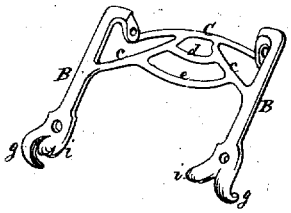

Figure 1 represents, in perspective, the handle and devices used to connect it to the axle and reach of a child's carriage. Fig. 2 represents a longitudinal vertical section through the same devices, drawn in full lines as attached to the rear axle, and in dotted lines to the front axle. Fig. 3 represents, in perspective, braces by which the sides of the handle are connected together and the handle to the axle of the carriage.

My invention relates to devices attached to the axle and reach of a child's carriage, in connection with the handle, by which said handle can be conveniently and promptly attached to the front or rear of the carriage, as may be desired.

It also relates to a handle made detachable from the running-gear of the carriage, and a connecting-lever made removable with the handle, one end of the connecting-lever being adapted to engage a fastening device on the reach.

Also, in a handle removably connected with the axle by means of a hook and eye combined with a lever attached to the handle, and removably combined with the reach to hold the handle firmly in position when the lever is in engagement with a locking device located in the reach.

To enable those skilled in the art to make and use my invention, I will proceed to describe the same with reference to the drawings.

The handle A is composed of side pieces *a a*, united at the top by means of a transverse bar, *a'*. At the lower extremity of each of these side pieces is a handle-iron, B, provided with a hook, *g*, to engage or embrace an eye or projection, *h*, attached to the axle or reach-feet *i*, forming part of the irons, co-operating with the axle E, to act as back stops for the handle and prevent its moving farther toward the body of the carriage.

These handle-irons are preferably cast in one piece, as in Fig. 3, which shows them connected by a main brace, C, and smaller or auxiliary strengthening-braces *c d e*, the main brace serving as the fulcrum for the lever D, which is attached to the handle, and made removable with it from the axle.

The opposite end of the lever D is provided with one member, *l*, of the locking device, while the other member G (shown as provided with two prongs *k*, either of which may be engaged by the opening in the member *l*) is connected with the reach part F of the running-gear.

The lever D is provided with a spring, *f*, connected therewith by a bolt, *f'*, the free end of the spring engaging the brace *d*, so that the free end of the lever D, provided with the plate *l*, will be thrown down in position to engage a prong, *k*, as the lever is moved in the direction of the arrow, so as to lock the parts together.

The lever D is pivoted to the transverse bar C by means of the retaining-staple *m*, attached to the lower side of it, and secured by braces *n*, that are also pivoted to the handle A at *p*, in line with the transverse bar C.

The eyes *h* are placed at the same distance apart under the front and rear axles, so that the hook *g* on the end of the handle-irons will readily engage with them when the handle A is applied to the rear or front axle of the carriage, and, the projections *k* of G being placed at or near the centers of the reaches F, the lever D will engage as well with them when the handle is at the front as at the rear of the carriage.

To remove the handle from the position shown in full lines to the position shown in dotted lines, the handle is slightly lifted, so as to move the lever D a short distance forward, far enough to relieve the plate *l* from the most of its friction with the projection *k*, and then the end *x* of the lever is depressed, so as to lift the member *l* of the locking device from its fellow member G, when the handle may be somewhat lowered and lifted from engagement with the eyes or portions *h* of the axle, and, together with the lever connected with it, may be removed to be engaged with the other axle, this change of position of the handle from one to the other axle enabling the carriage to be pushed or drawn, as desired.

When it is desired to attach the handle of the carriage, either front or back, the hooks are passed through the eyes *h* and the handle A raised until the lever D is securely latched over the projections *k*. The free end of the spring *f*, bearing against the brace *d*, presses the lever D down upon the projections *k*, while the feet *i* on the lower end of the handle keep them from reaching too far forward.

By this arrangement of the handles the carriages can be made to occupy much less space in transportation, as the handles can be removed and the latch-lever be reversed so as to lie out of the way between the handles.

I denominate this axle and reach as the running-gear.

In this my invention I dispense with bolts and nuts to hold the handle and running-gear together.

I do not herein claim a handle pivoted at one end to the reach and made to turn toward either end of the carriage at will.

Having thus fully described my invention, what I claim is—

1. In a child's carriage, a handle detachably connected with the axle by connecting means substantially as described, and a lever to connect the handle and reach, as and for the purpose set forth.

2. In a child's carriage, a handle connected with the running-gear by a hook-and-eye connection, to permit their ready disengagement, combined with a lever and a spring connected therewith, the lever and spring co-operating with the handle and a locking device located upon the reach, to permit the handle to be held firmly in position or to be readily removed from the carriage.

3. In a child's carriage, eyes or projections *h*, attached to each axle, and a locking member attached to the reach, combined with a handle provided with hooks, and a lever connected with the handle and provided with one member of a locking device, to permit the detachment of the handle and lever from one axle and its attachment to the other axle without the removal of nuts, substantially as described.

4. In combination with eyes attached to the axle of a child's carriage, the hooks *g* and feet *i*, formed on the lower extremity of the handle-irons, to connect the handle with the carriage, substantially in the manner and for the purpose specified.

5. The combination, with the handle of a child's carriage, connected by hooks to eyes attached to the axle, and the projection *k*, placed at or near the center of the reach F, of the pivoted lever D, spring *f*, and brace *d*, substantially as and for the purpose described.

6. The lever D and spring *f*, combined with the braces C *d*, substantially as described.

7. The combination, with the lever and reach, of the locking devices *l k* G, substantially as described.

8. The detachable reversible handle provided with a brace near its lower end, combined with the lever pivoted upon such brace, and with a brace attached to the lever and pivoted upon the handle, to turn when the lever is turned, substantially as shown and described.

9. The handle provided with a brace connecting the side pieces *a a* near their lower ends, and mechanism, substantially as described, to connect the handle with the axle, combined with a lever pivoted upon the brace and adapted at its outer or free end to be detachably connected with the reach, substantially as described.

FRANCIS W. WHITNEY.

Witnesses:

HAMILTON MAYO,
F. A. WHITNEY.